350-412
9/7/82 OR 4,348,081

United States Patent [19] [11] 4,348,081
Betensky [45] * Sep. 7, 1982

[54] PROJECTION LENS

[75] Inventor: Ellis I. Betensky, New York, N.Y.

[73] Assignee: U.S. Precision Lens Inc., Cincinnati, Ohio

[ * ] Notice: The portion of the term of this patent subsequent to Nov. 17, 1998, has been disclaimed.

[21] Appl. No.: 228,012

[22] Filed: Jan. 28, 1981

Related U.S. Application Data

[63] Continuation-in-part of Ser. No. 70,748, Sep. 5, 1979, Pat. No. 4,300,817, which is a continuation-in-part of Ser. No. 940,724, Sep. 6, 1978, abandoned.

[51] Int. Cl.[3] .......... G02B 3/04; G02B 9/12; G02B 9/34; G02B 27/18

[52] U.S. Cl. .......... 350/412; 350/432; 350/473; 350/477

[58] Field of Search .......... 350/473, 477, 412, 432–435

[56] References Cited

U.S. PATENT DOCUMENTS

| | | | |
|---|---|---|---|
| 2,440,088 | 4/1948 | Grey | 350/453 |
| 2,737,849 | 3/1956 | Tiller | 350/415 |
| 3,800,085 | 3/1974 | Ambats et al. | 350/420 |
| 3,868,173 | 2/1975 | Miles et al. | 350/432 |
| 3,951,523 | 4/1976 | Nishimoto | 350/432 |
| 3,998,527 | 12/1976 | Ikeda et al. | 350/432 |

FOREIGN PATENT DOCUMENTS

| | | | |
|---|---|---|---|
| 593514 | 10/1947 | United Kingdom | 350/473 |

*Primary Examiner*—John K. Corbin
*Assistant Examiner*—Scott J. Sugarman
*Attorney, Agent, or Firm*—Costas, Montgomery & Dorman

[57] ABSTRACT

A projection lens for a cathode ray tube comprises three groups. The overall positive power of the lens is provided by the first and second groups. The third group of negative power primarily corrects for Petzval curvature. In one form, the second group comprises a bi-convex element and a positive element. In preferred forms some of the lens surfaces are aspheric.

22 Claims, 2 Drawing Figures

PROJECTION LENS

BACKGROUND OF THE INVENTION

This invention is a continuation-in-part of application Ser. No. 070,748 filed Sept. 5, 1979, now U.S. Pat. No. 4,300,817 which is a continuation-in-part of application Ser. No. 940,724 filed Sept. 6, 1978, now abandoned, the disclosures of which applications are incorporated herein by reference.

This invention relates to projection lenses, and more particularly, relates to lenses adapted to project an enlargement of an image appearing on a cathode ray tube (CRT) such as a screen of a television set.

When projecting an object such as a one-color CRT as used in three tube color projection television systems, it is often not necessary to correct the chromatic aberration due to the limited bandwidths of each CRT. Conventional types of objectives have thus far been used which have eliminated the necessity of employing materials of different dispersions. These objectives, however, are still complex design forms, because of the need to correct for other aberrations. Even with the addition of aspherical surfaces, such objectives have negative power in the vicinity of the principal points.

Because the total objective optical power must be positive, prior art objectives are complex and tend to be sensitive to manufacturing variations. Accordingly, the present invention provides a projection lens in which the sum of the positive optical power is minimized, thus reducing complexity of manufacturing difficulty, and which further utilizes only three groups. The groups may be divided for increased aperture or field, but in the simplest form of the invention, each group comprises a single element.

Co-pending application Ser. No. 070,748 now U.S. Pat. No. 4,300,817 discloses a lens which comprises from the image end a first group which is an aperture dependent aberration corrector element of essentially no optical power, a second positive group providing essentially all the positive power of the lens, and a third group which corrects for field curvature, and some cases, distortion. The optical power of the first group as a ratio to unity power of the overall lens is between 0.1 and 0.4.

SUMMARY OF THE INVENTION

Briefly stated, the present invention comprises from the image end a first group of positive power which also corrects aperture dependent aberrations, a second positive group, and a third group which corrects for field curvature, and in some cases distortion. The powers of the groups K1, K2 and K3 are chosen in a range related to unity power of the overall lens as follows:

$$0.25<K1<0.50$$

$$0.85<K2<1.20$$

$$-1.3<K3<-0.9$$

The elements of the groups may also have aspheric surfaces. In one form of the invention, the first and third groups consist of a single element and the second group consists of a bi-convex element and a second positive element.

An object of this invention is to provide a new and improved projection lens for a CRT.

Another object of this invention is to provide a new and improved projection lens for a CRT of increased relative aperture, while maintaining good aberration correction and relative illumination.

Other objects of this invention will become apparent from the detailed description and accompanying drawings.

DETAILED DESCRIPTION

Figure 1:
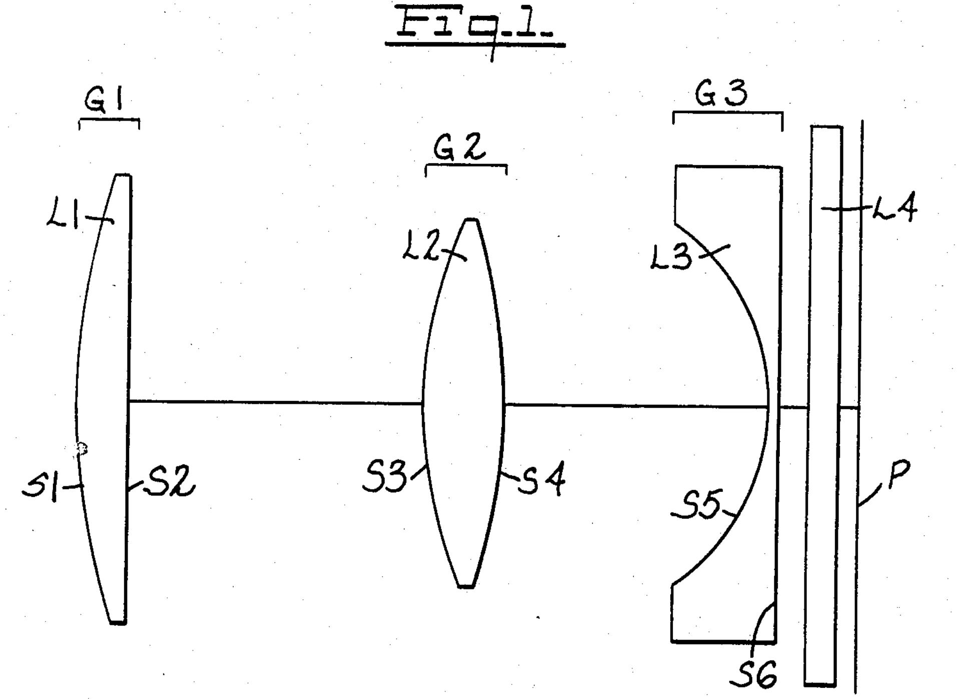
FIG. 1 illustrates a side elevation of a general lens form embodying the invention.

A lens embodying the invention comprises three groups: G1, G2 and G3 from the image end to the object end thereof. In the simplest form of the invention, each group comprises a single element as shown in FIG. 1. The lens elements are designated by L followed by a numeral indicating the sequential position of the element from the image end to the object end of the lens. The surfaces of the respective elements are designated by S followed by a numeral indicating the sequential position of the surface from the image end to the object end of the lens.

With further reference to FIG. 1, Group G1 comprises an element L1 of positive optical power spaced substantially from element L2 of Group G2. Element L1 corrects for aperture dependent aberrations, as well as providing for some of the overall positive power of the lens. Element L1 in its simplest form has one aspheric surface and one plano surface.

In the simplest form of the invention, Group G2 comprises a single element L2. Element L2 is a bi-convex element of positive optical power. Element L2 together with Element L1 provides essentially all of the positive power of the overall lens.

Group G3 comprises element L3 which is an element of negative optical power with a concave image side surface S5. In one form, the image side surface S5 is aspheric and the object side surface S6 is plano. Element L3 serves as a field flattener which essentially corrects the Petzval curvature of the elements of Groups G1 and G2.

In FIG. 1, element L4 is a radiation shield usually used with a monochromatic CRT projection system. The surface of the CRT is designated P. Element L4 has two plano surfaces S7 and S8 and contributes no optical power to the lens.

Figure 2:
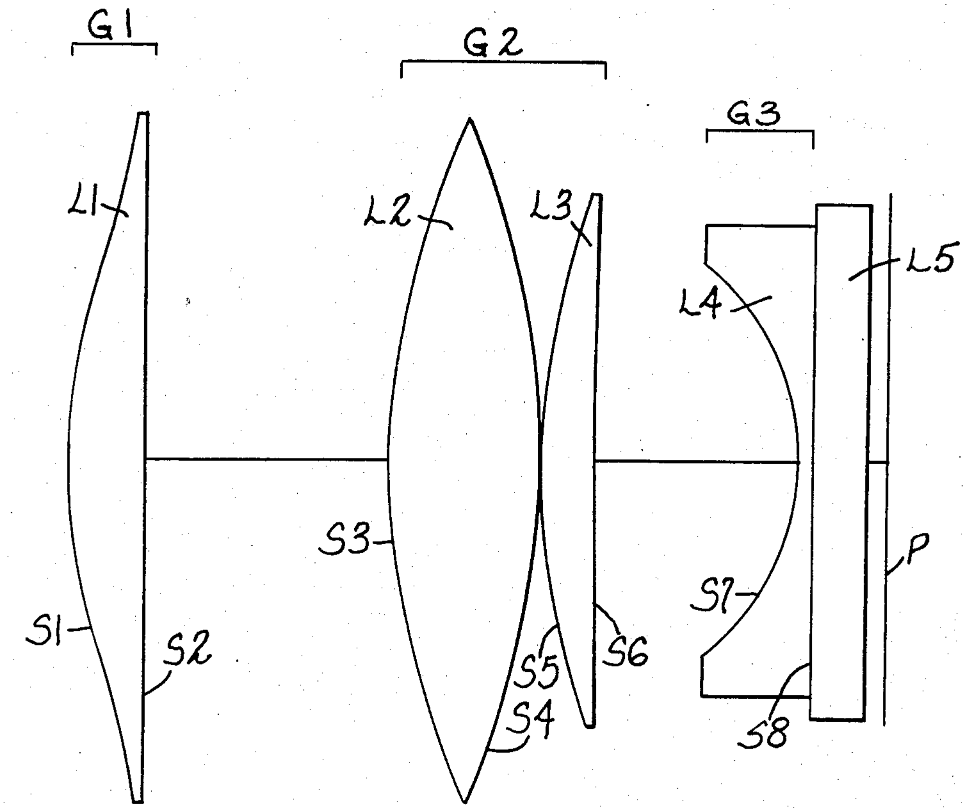
FIG. 2 illustrates a side elevation of a general lens form embodying a second form of the invention.

A second form of the invention as illustrated in FIG. 2 differs from the previously described form primarily with respect to Group G2. Group G2 comprises elements L2 and L3. Element L2 is a bi-convex element of positive optical power. Element L3 which is closely spaced to element L2 comprises an element having a convex image side surface S5 and an object side surface S6 which is nearly plano. It is preferred that each of the elements L2 and L3 have at least one aspheric surface.

In the second form, Group G1 comprises element L1 of positive optical power having a convex image side surface S1 and a nearly plano to plano surface S2. S1 is preferably an aspheric surface.

In the form of the invention shown in FIG. 2, Group G3 comprises element L4 having a concave image side surface S7 of strong negative optical power, and a plano object side surface S8. It is preferred that surface S7 be aspheric.

With further reference to FIG. 2, a radiation shield L5 having the properties previously described for the radiation shield L4 of the first form of the invention may also be employed.

A lens embodying the invention preferably has one or more aspheric surfaces as previously described and as will be made apparent from the examples in the following tables. The aspheric surfaces may be defined by the following equation:

$$X = \frac{Cy^2}{1 + \sqrt{1 - (1 + K)\,C^2y^2}} + Dy^4 + Ey^6 + Fy^8 + Gy^{10}$$

Where X is the surface sag at a semi-aperture distance y from the axis A of the lens, C is the curvature of a lens surface of the optical axis A equal to the reciprocal of the radius of the optical axis, K is a conic constant or other surface of revolution.

The following examples in Tables I–X are exemplary of lenses embodying the invention which are useful primarily for monochromatic CRT's and are not color corrected. The lenses of Tables I–X have aspheric surfaces defined by the foregoing aspheric equation. In the tables, the surface radius for the surface denoted by S followed by the surface number, is the radius at the optical axis, $N_d$ is the index of refraction, and $V_d$ is the Abbe number. Positive surface radii are struck from the right and negative radii are struck from the left. The image is to the right at the surface of the CRT. The radiation shielding element, either L4 or L5 depending upon the form, is generally present, but is a consideration which is not an important factor in the overall lens design. In the Tables, the relative aperture is measured from the short conjugate.

Tables I, II and VII–X are exemplary of examples as illustrated in FIG. 1. Tables III–VI are exemplary of examples as illustrated in FIG. 2.

TABLE I

A lens as shown in FIG. 1 scaled to an EFL of 116.1mm and relative aperture of f/1.0 is described substantially as follows:

| | | Surface Radius (mm) | Axial Distance Between Surfaces (mm) | $N_d$ | $V_d$ |
|---|---|---|---|---|---|
| | S1 | 120.63 | | | |
| L1 | | | 15.20 | 1.492 | 57.1 |
| | S2 | ∞ | | | |

TABLE I-continued

A lens as shown in FIG. 1 scaled to an EFL of 116.1mm and relative aperture of f/1.0 is described substantially as follows:

| | | | | | |
|---|---|---|---|---|---|
| | | | 77.11 | | |
| | S3 | 163.00 | | | |
| L2 | | | 20.49 | 1.717 | 29.5 |
| | S4 | −218.44 | | | |
| | | | 61.46 | | |
| | S5 | −51.68 | | | |
| L3 | | | 3.00 | 1.492 | 57.1 |
| | S6 | ∞ | | | |
| | | | .01 | | |
| | S7 | ∞ | | | |
| L4 | | | 10.16 | 1.522 | 59.2 |
| | S8 | ∞ | | | |

Aspheric surfaces: S1, S5

| | S1 | S5 |
|---|---|---|
| D | $-.2718 \times 10^{-6}$ | $-.3851 \times 10^{-5}$ |
| E | $-.1522 \times 10^{-10}$ | $.1881 \times 10^{-8}$ |
| F | $-.3356 \times 10^{-14}$ | $-.7653 \times 10^{-12}$ |
| G | $-.5339 \times 10^{-18}$ | $.1380 \times 10^{-15}$ |
| K | 1.326 | −5.599 |

TABLE II

A lens as shown in FIG. 1 scaled to an EFL of 133.1mm and relative aperture of f/1.11 is described substantially as follows:

| | | Surface Radius (mm) | Axial Distance Between Surfaces (mm) | $N_d$ | $V_d$ |
|---|---|---|---|---|---|
| | S1 | 139.71 | | | |
| L1 | | | 15.00 | 1.492 | 57.1 |
| | S2 | ∞ | | | |
| | | | 96.00 | | |
| | S3 | 146.59 | | | |
| L2 | | | 14.62 | 1.714 | 35.9 |
| | S4 | −309.71 | | | |
| | | | 65.16 | | |
| | S5 | −71.78 | | | |
| L3 | | | 2.00 | 1.492 | 57.1 |
| | S6 | ∞ | | | |
| | | | .01 | | |
| | S7 | ∞ | | | |
| L4 | | | 16.00 | 1.528 | 60.0 |
| | S8 | ∞ | | | |

Aspheric surfaces: S1, S5

| | S1 | S5 |
|---|---|---|
| D | $-.1655 \times 10^{-6}$ | $-.2652 \times 10^{-5}$ |
| E | $-.2152 \times 10^{-11}$ | $.9009 \times 10^{-9}$ |
| F | $-.1721 \times 10^{-14}$ | $-.2364 \times 10^{-12}$ |
| G | $-.1328 \times 10^{-19}$ | $.3548 \times 10^{-16}$ |
| K | .958 | −4.656 |

TABLE III

A lens as shown in FIG. 2 scaled to an EFL of 86.16mm and relative aperture of f/.85 is described substantially as follows:

| | | Surface Radius (mm) | Axial Distance Between Surfaces (mm) | $N_d$ | $V_d$ |
|---|---|---|---|---|---|
| | S1 | 93.86 | | | |
| L1 | | | 12.84 | 1.492 | 57.1 |
| | S2 | 21986.96 | | | |
| | | | 43.32 | | |
| | S3 | 125.08 | | | |
| L2 | | | 26.30 | 1.492 | 57.1 |
| | S4 | −102.57 | | | |
| | | | .33 | | |
| | S5 | 186.40 | | | |
| L3 | | | 9.24 | 1.492 | 57.1 |
| | S6 | 1566.49 | | | |
| | | | 36.72 | | |
| | S7 | −38.11 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |

TABLE III-continued

A lens as shown in FIG. 2 scaled to an EFL of 86.16mm and relative aperture of f/.85 is described substantially as follows:

| | | |
|---|---|---|
| S10 | ∞ | |

Aspheric surfaces: S1, S4, S6, S7

| | S1 | S4 | S6 | S7 |
|---|---|---|---|---|
| D | $-.7128 \times 10^{-6}$ | $-.1335 \times 10^{-6}$ | $-.5700 \times 10^{-6}$ | $-.1224 \times 10^{-4}$ |
| E | $-.1678 \times 10^{-10}$ | $-.6192 \times 10^{-11}$ | $-.1348 \times 10^{-9}$ | $.9949 \times 10^{-8}$ |
| F | $-.4786 \times 10^{-13}$ | $.4477 \times 10^{-14}$ | $.1831 \times 10^{-13}$ | $-.5961 \times 10^{-11}$ |
| G | $-.1534 \times 10^{-17}$ | $.1575 \times 10^{-17}$ | $.1097 \times 10^{-16}$ | $.1800 \times 10^{-14}$ |
| K | 1.326 | −5.183 | .010 | −5.599 |

TABLE IV

A lens as shown in FIG. 2 scaled to an EFL of 86.04mm and relative aperture of f/.85 is described substantially as follows:

| | | Surface Radius (mm) | Axial Distance Between Surfaces (mm) | $N_d$ | $V_d$ |
|---|---|---|---|---|---|
| | S1 | 95.35 | | | |
| L1 | | | 11.52 | 1.492 | 57.1 |
| | S2 | 1924.80 | | | |
| | | | 42.33 | | |
| | S3 | 129.91 | | | |
| L2 | | | 27.80 | 1.492 | 57.1 |
| | S4 | −118.98 | | | |
| | | | 0 | | |
| | S5 | 148.38 | | | |
| L3 | | | 10.97 | 1.492 | 57.1 |
| | S6 | 13409.13 | | | |
| | | | 37.84 | | |
| | S7 | −38.03 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |
| | S10 | ∞ | | | |

Aspheric surfaces: S1, S3, S5, S7

| | S1 | S3 | S5 | S7 |
|---|---|---|---|---|
| D | $-.7191 \times 10^{-6}$ | $-.1232 \times 10^{-7}$ | $.2028 \times 10^{-6}$ | $-.1143 \times 10^{-4}$ |
| E | $-.9177 \times 10^{-11}$ | $-.6531 \times 10^{-11}$ | $.1260 \times 10^{-9}$ | $.9417 \times 10^{-8}$ |
| F | $-.4670 \times 10^{-13}$ | $-.2263 \times 10^{-14}$ | $.2751 \times 10^{-13}$ | $-.6630 \times 10^{-11}$ |
| G | $-.1791 \times 10^{-17}$ | $-.8525 \times 10^{-18}$ | $.2374 \times 10^{-17}$ | $.2404 \times 10^{-14}$ |
| K | 1.326 | −1.000 | −1.000 | −5.599 |

TABLE V

A lens as shown in FIG. 2 scaled to an EFL of 86.06mm and relative aperture of f/.85 is described substantially as follows:

| | | Surface Radius (mm) | Axial Distance Between Surfaces (mm) | $N_d$ | $V_d$ |
|---|---|---|---|---|---|
| | S1 | 94.30 | | | |
| L1 | | | 12.55 | 1.492 | 57.1 |
| | S2 | 7275.93 | | | |
| | | | 43.00 | | |
| | S3 | 122.74 | | | |
| L2 | | | 27.09 | 1.492 | 57.1 |
| | S4 | −115.51 | | | |
| | | | .20 | | |
| | S5 | 157.69 | | | |
| L3 | | | 9.54 | 1.492 | 57.1 |
| | S6 | 1911.82 | | | |
| | | | 36.74 | | |
| | S7 | −37.44 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |
| | S10 | ∞ | | | |

Aspheric surfaces: S1, S4, S5, S7

| | S1 | S4 | S5 | S7 |
|---|---|---|---|---|
| D | $-.7184 \times 10^{-6}$ | $-.1860 \times 10^{-6}$ | $.3407 \times 10^{-6}$ | $-.1176 \times 10^{-4}$ |
| E | $-.9375 \times 10^{-11}$ | $-.1446 \times 10^{-10}$ | $.1060 \times 10^{-9}$ | $.9277 \times 10^{-8}$ |
| F | $-.4751 \times 10^{-13}$ | $.3349 \times 10^{-14}$ | $.1848 \times 10^{-13}$ | $-.5821 \times 10^{-11}$ |
| G | $-.1866 \times 10^{-17}$ | $.1534 \times 10^{-17}$ | $.2741 \times 10^{-17}$ | $.1873 \times 10^{-14}$ |

TABLE V-continued

A lens as shown in FIG. 2 scaled to an EFL of 86.06mm and relative aperture of f/.85 is described substantially as follows:

| | | | | |
|---|---|---|---|---|
| K | 1.326 | −5.183 | −1.000 | −5.599 |

TABLE VI

A lens as shown in FIG. 2 scaled to an EFL of 85.69mm and relative aperture of f/.85 is described substantially as follows:

| | | Surface Radius (mm) | Axial Distance Between Surfaces (mm) | $N_d$ | $V_d$ |
|---|---|---|---|---|---|
| | S1 | 93.53 | | | |
| L1 | | | 13.13 | 1.492 | 57.1 |
| | S2 | ∞ | | | |
| | | | 41.46 | | |
| | S3 | 125.97 | | | |
| L2 | | | 26.84 | 1.492 | 57.1 |
| | S4 | −100.19 | | | |
| | | | .10 | | |
| | S5 | 202.04 | | | |
| L3 | | | 11.21 | 1.492 | 57.1 |
| | S6 | 4197.97 | | | |
| | | | 35.41 | | |
| | S7 | −34.63 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |
| | S10 | ∞ | | | |

Aspheric surfaces: S1, S4, S6, S7

| | S1 | S4 | S6 | S7 |
|---|---|---|---|---|
| D | $-.7347 \times 10^{-6}$ | $-.1490 \times 10^{-6}$ | $-.6043 \times 10^{-6}$ | $-.1266 \times 10^{-4}$ |
| E | $-.2408 \times 10^{-10}$ | $-.1751 \times 10^{-10}$ | $-.1634 \times 10^{-9}$ | $.1026 \times 10^{-7}$ |
| F | $-.4894 \times 10^{-13}$ | $.1181 \times 10^{-13}$ | $-.8278 \times 10^{-14}$ | $-.6781 \times 10^{-11}$ |
| G | $-.1350 \times 10^{-17}$ | $.2882 \times 10^{-17}$ | $.1713 \times 10^{-16}$ | $.2260 \times 10^{-14}$ |
| K | 1.326 | −5.183 | .010 | −5.599 |

TABLE VII

A lens as shown in FIG. 1 scaled to an EFL of 185.0mm and relative aperture of f/1.16 is described substantially as follows:

| | | Surface Radius (mm) | Axial Distance Between Surfaces (mm) | $N_d$ | $V_d$ |
|---|---|---|---|---|---|
| | S1 | 277.28 | | | |
| L1 | | | 16.32 | 1.492 | 57.1 |
| | S2 | ∞ | | | |
| | | | 165.00 | | |
| | S3 | 134.85 | | | |
| L2 | | | 34.21 | 1.492 | 57.1 |
| | S4 | −320.56 | | | |
| | | | 119.16 | | |
| | S5 | −71.29 | | | |
| L3 | | | 2.0 | 1.492 | 57.1 |
| | S6 | ∞ | | | |
| | | | 0 | | |
| | S7 | ∞ | | | |
| L4 | | | 19.50 | 1.501 | 56.3 |
| | S8 | ∞ | | | |

Aspheric surfaces: S1, S4, S5

| | S1 | S4 | S5 |
|---|---|---|---|
| D | $-.3271 \times 10^{-7}$ | $.3372 \times 10^{-7}$ | $-.1161 \times 10^{-5}$ |
| E | $.5710 \times 10^{-13}$ | $-.8155 \times 10^{-13}$ | $.1336 \times 10^{-9}$ |
| F | $-.9089 \times 10^{-16}$ | $-.1687 \times 10^{-15}$ | $-.6962 \times 10^{-14}$ |
| G | $.3046 \times 10^{-20}$ | $.1257 \times 10^{-19}$ | $-.5108 \times 10^{-18}$ |
| K | 1.326 | −5.183 | −5.599 |

TABLE VIII

A lens as shown in FIG. 1 scaled to an EFL of 86.06mm and relative aperture of f/1.63 is described substantially as follows:

| | | Surface Radius (mm) | Axial Distance Between Surfaces (mm) | $N_d$ | $V_d$ |
|---|---|---|---|---|---|
| | S1 | 135.41 | | | |
| L1 | | | 7.32 | 1.492 | 57.1 |

TABLE VIII-continued

A lens as shown in FIG. 1 scaled to an EFL of 86.06mm and relative aperture of f/1.63 is described substantially as follows:

| | | | | | |
|---|---|---|---|---|---|
| | S2 | ∞ | | | |
| | | | 72.25 | | |
| | S3 | 80.59 | | | |
| L2 | | | 12.63 | 1.492 | 57.1 |
| | S4 | −120.47 | | | |
| | | | 66.57 | | |
| | S5 | −33.11 | | | |
| L3 | | | 4.00 | 1.492 | 57.1 |
| | S6 | ∞ | | | |
| | | | 0 | | |
| | S7 | ∞ | | | |
| L4 | | | 5.00 | 1.522 | 59.2 |
| | S8 | ∞ | | | |

Aspheric surfaces: S1, S4, S5

| | S1 | S4 | S5 |
|---|---|---|---|
| D | $-.3590 \times 10^{-6}$ | $.1889 \times 10^{-7}$ | $-.9383 \times 10^{-5}$ |
| E | $-.4365 \times 10^{-10}$ | $-.1168 \times 10^{-11}$ | $.5695 \times 10^{-8}$ |
| F | $.2916 \times 10^{-14}$ | $.3344 \times 10^{-13}$ | $-.2003 \times 10^{-11}$ |
| G | $-.3065 \times 10^{-17}$ | $-.2635 \times 10^{-16}$ | $.1016 \times 10^{-15}$ |
| K | 1.326 | −5.183 | −5.600 |

TABLE IX

A lens as shown in FIG. 1 scaled to an EFL of 161.5mm and relative aperture of f/1.36 is described substantially as follows:

| | | Surface Radius (mm) | Axial Distance Between Surfaces (mm) | $N_d$ | $V_d$ |
|---|---|---|---|---|---|
| | S1 | 295.91 | | | |
| L1 | | | 12.40 | 1.492 | 57.1 |
| | S2 | | | | |
| | | | 157.80 | | |
| | S3 | 124.43 | | | |
| L2 | | | 26.77 | 1.492 | 57.1 |

TABLE IX-continued

A lens as shown in FIG. 1 scaled to an EFL of 161.5mm and relative aperture of f/1.36 is described substantially as follows:

| | | | | | |
|---|---|---|---|---|---|
| | S4 | −247.76 | | | |
| | | | 119.00 | | |
| | S5 | −65.61 | | | |
| L3 | | | 2.00 | 1.492 | 57.1 |
| | S6 | | | | |
| | | | .02 | | |
| | S7 | | | | |
| L4 | | | 10.00 | 1.522 | 59.2 |
| | S8 | | | | |

Aspheric surfaces: S1, S4, S5

| | S1 | S4 | S5 |
|---|---|---|---|
| D | $-.4807 \times 10^{-7}$ | $.4615 \times 10^{-7}$ | $-.1975 \times 10^{-5}$ |
| E | $.1293 \times 10^{-11}$ | $.8841 \times 10^{-12}$ | $.5394 \times 10^{-9}$ |
| F | $-.4013 \times 10^{-15}$ | $-.5635 \times 10^{-15}$ | $-.1015 \times 10^{-12}$ |
| G | $.2201 \times 10^{-19}$ | $.4264 \times 10^{-19}$ | $.6804 \times 10^{-17}$ |
| K | 1.326 | −5.183 | −5.599 |

TABLE X

A lens as shown in FIG. 1 scaled to an EFL of 144.8mm and relative aperture of f/1.34 is described substantially as follows:

| | | Surface Radius (mm) | Axial Distance Between Surfaces (mm) | $N_d$ | $V_d$ |
|---|---|---|---|---|---|
| | S1 | 206.94 | | | |
| L1 | | | 14.75 | 1.492 | 57.1 |
| | S2 | ∞ | | | |
| | | | 101.60 | | |
| | S3 | 133.35 | | | |
| L2 | | | 26.92 | 1.492 | 57.1 |
| | S4 | −168.93 | | | |
| | | | 90.82 | | |
| | S5 | −59.54 | | | |
| L3 | | | 4.00 | 1.492 | 57.1 |
| | S6 | ∞ | | | |
| | | | 10.00 | | |
| | S7 | ∞ | | 1.522 | 59.5 |
| L4 | | | 10.00 | | |
| | S8 | ∞ | | | |

Aspheric surfaces: S1, S4, S5

| | S1 | S4 | S5 |
|---|---|---|---|
| D | $-.1095 \times 10^{-6}$ | $-.3706 \times 10^{-7}$ | $-.2206 \times 10^{-5}$ |
| E | $-.2939 \times 10^{-11}$ | $.2728 \times 10^{-11}$ | $.5295 \times 10^{-9}$ |
| F | $-.5110 \times 10^{-15}$ | $.5544 \times 10^{-15}$ | $-.9310 \times 10^{-13}$ |
| G | $-.5232 \times 10^{-20}$ | $-.9772 \times 10^{-19}$ | $.6095 \times 10^{-17}$ |
| K | 1.326 | −5.183 | −5.599 |

The powers K of the Groups of the lenses of Tables I–X as a ratio to unity focal length of the overall lens are set forth in Table XI.

TABLE XI

| | K1 | K2 | K3 |
|---|---|---|---|
| Table I | .475 | .879 | −1.109 |
| Table II | .470 | .943 | −.914 |
| Table III | .451 | 1.071 | −1.115 |
| Table IV | .424 | 1.127 | −1.115 |
| Table V | .444 | 1.102 | −1.113 |
| Table VI | .452 | 1.072 | −1.221 |
| Table VII | .329 | .937 | −1.279 |
| Table VIII | .313 | .860 | −1.282 |
| Table IX | .269 | .940 | −1.215 |
| Table X | .345 | .930 | −1.200 |

Where K1 is the power of the first group, K2 is the power of the second group, and K3 is the power of the third group. The power of the overall lens is designated as unit.

A lens embodying the invention as shown by Table VIII has group powers as a ratio to the power of the overall lens as follows:

$$0.25 < K1 < 0.50$$

$$0.85 < K2 < 1.20$$

$$-1.3 < K3 < -0.9$$

Table XII sets forth the spacing between the groups as a ratio of the axial spacing to the equivalent focal length of the overall lens.

TABLE XII

| | G1-G2 | G2-G3 |
|---|---|---|
| TABLE I | .664 | .529 |
| TABLE II | .721 | .490 |
| TABLE III | .503 | .426 |
| TABLE IV | .492 | .440 |
| TABLE V | .500 | .427 |
| TABLE VI | .484 | .413 |
| TABLE VII | .892 | .644 |
| TABLE VIII | .840 | .774 |
| TABLE IX | .977 | .737 |
| TABLE X | .702 | .627 |

Where G1–G2 is the axial spacing between Groups G1 and G2, and G2–G3 is the axial spacing between Groups G2 and G3.

It can be seen from the foregoing Table XII that the axial spacings between the surfaces of the first and second groups is between 0.4 and 1.0 of the equivalent focal length of the overall lens. The axial spacing between the surfaces of the second and third group is between 0.4 and 0.8 of the equivalent focal length of the overall lens.

It may thus be seen that the objects of the invention set forth as well as those made apparent from the foregoing description are efficiently attained. While preferred embodiments of the invention have been set forth for purposes of disclosure, modification of the disclosed embodiments of the invention as well as other embodiments thereof may occur to those skilled in the art. Accordingly, the intended claims are intended to cover all of the embodiments of the invention and modifications to the disclosed embodiments which do not depart from the spirit and scope of the invention.

What I claim is:

1. A projection lens for a cathode ray tube display consisting of three groups, the first group from the image end comprising an element having at least one aspheric surface, the second group comprising a bi-convex element, the third group consisting a negative element having an aspheric surface concave to the image and serving as a field flattener essentially correcting the Petzval curvature of the first and second groups, said three groups have optical powers K1, K2 and K3, the overall lens has an optical power of 1.0, and $$0.25 < K1 < 0.50$$

$$0.85 < K2 < 1.20$$

$$-1.3 < K3 < -0.9$$

2. A projection lens for a cathode ray tube display consisting of three groups, the first group from the image end comprising an element of positive power, the second group comprising a bi-convex element, the third group comprising a negative element having an aspheric image side surface concave to the image end of strong negative power and a substantially plano object side surface, said third group essentially correcting the Petzval curvature of said first and second groups, said three groups having optical powers K1, K2 and K3, the overall lens has an optical power of 1.0, and $0.25 < K1 < 0.50$ $0.85 < K2 < 1.20$ $-0.9 < K3 < -1.3.$

3. The lens of claim 1 or claim 2 wherein the axial spacings between the surfaces of the second and third groups is between 0.4 and 0.8 of the equivalent focal length of said lens.

4. The lens of claim 1 or claim 2 wherein the axial spacing between the surfaces of the first and second groups is between 0.4 and 1.0 of the equivalent focal length of said lens.

5. A lens according to claim 1 having aspheric surfaces wherein each aspheric lens surface is defined by the following relationship:

$$X = \frac{Cy^2}{1 + \sqrt{1 - (1 + K) C^2 y^2}} + Dy^4 + Ey^6 + Fy^8 + Gy^{10}$$

Where X is the surface sag at a semi-aperture distance y from the optical axis of the lens, K is a conic constant, D, E, F, and G are constants.

6. A lens according to claim 5 scaled to an EFL of 116.1 mm and relative aperture of f/1.0 is described substantially as follows:

| | | Surface Radius (mm) | Axial Distance Between Surfaces (mm) | $N_d$ | $V_d$ |
|---|---|---|---|---|---|
| | S1 | 120.63 | | | |
| L1 | | | 15.20 | 1.492 | 57.1 |
| | S2 | ∞ | | | |
| | | | 77.11 | | |
| | S3 | 163.00 | | | |
| L2 | | | 20.49 | 1.717 | 29.5 |
| | S4 | −218.44 | | | |
| | | | 61.46 | | |
| | S5 | −51.68 | | | |
| L3 | | | 3.00 | 1.492 | 57.1 |
| | S6 | ∞ | | | |
| | | | .01 | | |
| | S7 | ∞ | | | |
| L4 | | | 10.15 | 1.522 | 59.5 |
| | S8 | ∞ | | | |

Aspheric Surfaces: S1, S5

| | S1 | S5 |
|---|---|---|
| D | $-.2718 \times 10^{-6}$ | $-.3851 \times 10^{-5}$ |
| E | $-.1522 \times 10^{-10}$ | $.1881 \times 10^{-8}$ |
| F | $-.3356 \times 10^{-14}$ | $-.7653 \times 10^{-12}$ |
| G | $-.5339 \times 10^{-18}$ | $.1380 \times 10^{-15}$ |
| K | 1.326 | −5.599 |

where L1–L4 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1 and S5 are aspheric.

7. A lens according to claim 5 scaled to an EFL of 133.1 mm and relative aperture of f/1.11 is described substantially as follows:

| | | Surface Radius (mm) | Axial Distance Between Surfaces (mm) | $N_d$ | $V_d$ |
|---|---|---|---|---|---|
| | S1 | 139.71 | | | |
| L1 | | | 15.00 | 1.492 | 57.1 |
| | S2 | ∞ | | | |
| | | | 96.00 | | |
| | S3 | 146.59 | | | |
| L2 | | | 14.62 | 1.714 | 35.9 |
| | S4 | −309.71 | | | |
| | | | 65.16 | | |
| | S5 | −71.78 | | | |
| L3 | | | 2.00 | 1.492 | 57.1 |
| | S6 | ∞ | | | |
| | | | .01 | | |
| | S7 | ∞ | | | |
| L4 | | | 16.00 | 1.528 | 60.0 |
| | S8 | ∞ | | | |

Aspheric Surfaces: S1, S5

| | S1 | S5 |
|---|---|---|
| D | $-.1655 \times 10^{-6}$ | $-.2652 \times 10^{-5}$ |
| E | $-.2152 \times 10^{-11}$ | $.9009 \times 10^{-9}$ |
| F | $-.1721 \times 10^{-14}$ | $-.2364 \times 10^{-12}$ |
| G | $-.1328 \times 10^{-19}$ | $.3548 \times 10^{-16}$ |
| K | .958 | −4.656 |

where L1–L4 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1 and S5 are aspheric.

8. A lens according to claim 5 scaled to an EFL of 86.16 mm and relative aperture of f/0.85 is described substantially as follows:

| | | Surface Radius (mm) | Axial Distance Between Surfaces (mm) | $N_d$ | $V_d$ |
|---|---|---|---|---|---|
| | S1 | 93.86 | | | |
| L1 | | | 12.84 | 1.492 | 57.1 |
| | S2 | 21986.96 | | | |
| | | | 43.32 | | |
| | S3 | 125.08 | | | |
| L2 | | | 26.30 | 1.492 | 57.1 |
| | S4 | −102.57 | | | |
| | | | .33 | | |
| | S5 | 186.40 | | | |
| L3 | | | 9.24 | 1.492 | 57.1 |
| | S6 | 1566.49 | | | |
| | | | 36.72 | | |
| | S7 | −38.11 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |
| | S10 | ∞ | | | |

Aspheric surfaces: S1, S4, S6, S7

| | S1 | S4 | S6 | S7 |
|---|---|---|---|---|
| D | $-.7128 \times 10^{-6}$ | $-.1335 \times 10^{-6}$ | $-.5700 \times 10^{-6}$ | $-.1224 \times 10^{-4}$ |
| E | $-.1678 \times 10^{-10}$ | $-.6192 \times 10^{-11}$ | $-.1348 \times 10^{-9}$ | $.9949 \times 10^{-8}$ |
| F | $-.4786 \times 10^{-13}$ | $.4477 \times 10^{-14}$ | $.1831 \times 10^{-13}$ | $-.5961 \times 10^{-11}$ |
| G | $-.1534 \times 10^{-17}$ | $.1575 \times 10^{-17}$ | $.1097 \times 10^{-16}$ | $.1800 \times 10^{-14}$ |
| K | 1.326 | −5.183 | .010 | −5.599 |

where L1–L5 are successive lens elements from the image end, S1–S10 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4, S6 and S7 are aspheric.

9. A lens according to claim 5 scaled to an EFL of 86.04 mm and relative aperture of f/0.85 is described substantially as follows:

| | | Surface Radius (mm) | Axial Distance Between Surfaces (mm) | $N_d$ | $V_d$ |
|---|---|---|---|---|---|
| | S1 | 95.35 | | | |
| L1 | | | 11.52 | 1.492 | 57.1 |
| | S2 | 1924.80 | | | |
| | | | 42.33 | | |
| | S3 | 129.91 | | | |
| L2 | | | 27.80 | 1.492 | 57.1 |
| | S4 | −118.98 | | | |
| | | | 0 | | |
| | S5 | 148.38 | | | |
| L3 | | | 10.97 | 1.492 | 57.1 |
| | S6 | 13409.13 | | | |
| | | | 37.84 | | |
| | S7 | −38.03 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |
| | S10 | ∞ | | | |

Aspheric surfaces: S1, S3, S5, S7

| | S1 | S3 | S5 | S7 |
|---|---|---|---|---|
| D | $-.7191 \times 10^{-6}$ | $-.1232 \times 10^{-7}$ | $.2028 \times 10^{-6}$ | $-.1143 \times 10^{-4}$ |
| E | $-.9177 \times 10^{-11}$ | $-.6531 \times 10^{-11}$ | $.1260 \times 10^{-9}$ | $.9417 \times 10^{-8}$ |
| F | $-.4670 \times 10^{-13}$ | $-.2263 \times 10^{-14}$ | $.2751 \times 10^{-13}$ | $-.6630 \times 10^{-11}$ |
| G | $-.1791 \times 10^{-17}$ | $-.8525 \times 10^{-18}$ | $.2374 \times 10^{-17}$ | $.2404 \times 10^{-14}$ |
| K | 1.326 | −1.000 | −1.000 | −5.599 |

where L1–L5 are successive lens elements from the image end, S1–S10 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S3, S5 and S7 are aspheric.

10. A lens according to claim 5 scaled to an EFL of 86.06 mm and relative aperture of f/0.85 is described substantially as follows:

| | | Surface Radius (mm) | Axial Distance Between Surfaces (mm) | $N_d$ | $V_d$ |
|---|---|---|---|---|---|
| | S1 | 94.30 | | | |
| L1 | | | 12.55 | 1.492 | 57.1 |
| | S2 | 7275.93 | | | |
| | | | 43.00 | | |
| | S3 | 122.74 | | | |
| L2 | | | 27.09 | 1.492 | 57.1 |
| | S4 | −115.51 | | | |
| | | | .20 | | |
| | S5 | 157.69 | | | |
| L3 | | | 9.54 | 1.492 | 57.1 |
| | S6 | 1911.82 | | | |
| | | | 36.74 | | |
| | S7 | −37.44 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |
| | S10 | ∞ | | | |

Aspheric surfaces: S1, S4, S5, S7

| | S1 | S4 | S5 | S7 |
|---|---|---|---|---|
| D | $-.7184 \times 10^{-6}$ | $-.1860 \times 10^{-6}$ | $.3407 \times 10^{-6}$ | $-.1176 \times 10^{-4}$ |
| E | $-.9375 \times 10^{-11}$ | $-1.446 \times 10^{-10}$ | $.1060 \times 10^{-9}$ | $.9277 \times 10^{-8}$ |
| F | $-.4751 \times 10^{-13}$ | $.3349 \times 10^{-14}$ | $.1848 \times 10^{-13}$ | $-.5821 \times 10^{-11}$ |
| G | $-.1866 \times 10^{-17}$ | $.1534 \times 10^{-17}$ | $.2741 \times 10^{-17}$ | $.1873 \times 10^{-14}$ |
| K | 1.326 | −5.183 | −1.000 | −5.599 |

where L1–L5 are successive lens elements from the image end, S1–S10 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4, S5 and S7 are aspheric.

11. A lens according to claim 5 scaled to an EFL of 85.69 mm and relative aperture of f/0.85 is described substantially as follows:

| | | Surface Radius (mm) | Axial Distance Between Surfaces (mm) | $N_d$ | $V_d$ |
|---|---|---|---|---|---|
| | S1 | 93.53 | | | |
| L1 | | | 13.13 | 1.492 | 57.1 |
| | S2 | ∞ | | | |
| | | | 41.46 | | |
| | S3 | 125.97 | | | |
| L2 | | | 26.84 | 1.492 | 57.1 |
| | S4 | −100.19 | | | |
| | | | .10 | | |
| | S5 | 202.04 | | | |
| L3 | | | 11.21 | 1.492 | 57.1 |
| | S6 | 4197.97 | | | |
| | | | 35.41 | | |
| | S7 | −34.63 | | | |
| L4 | | | 2.00 | 1.492 | 57.1 |
| | S8 | ∞ | | | |
| | | | .07 | | |
| | S9 | ∞ | | | |
| L5 | | | 9.00 | 1.501 | 56.3 |
| | S10 | ∞ | | | |

Aspheric surfaces: S1, S4, S6, S7

| | S1 | S4 | S6 | S7 |
|---|---|---|---|---|
| D | $-.7347 \times 10^{-6}$ | $-.1490 \times 10^{-6}$ | $-.6043 \times 10^{-6}$ | $-.1266 \times 10^{-4}$ |
| E | $-.2408 \times 10^{-10}$ | $-.1751 \times 10^{-10}$ | $-.1634 \times 10^{-9}$ | $.1026 \times 10^{-7}$ |
| F | $-.4894 \times 10^{-13}$ | $.1181 \times 10^{-13}$ | $-.8278 \times 10^{-14}$ | $-.6781 \times 10^{-11}$ |
| G | $-.1350 \times 10^{-17}$ | $.2882 \times 10^{-17}$ | $.1713 \times 10^{-16}$ | $.2260 \times 10^{-14}$ |
| K | 1.326 | −5.183 | .010 | −5.599 |

where L1–L5 are successive lens elements from the image end, S1–S10 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4, S6 and S7 are aspheric.

12. A lens according to claim 5 scaled to an EFL of 185.0 mm and relative aperture of f/1.16 is described substantially as follows:

| | | Surface Radius (mm) | Axial Distance Between Surfaces (mm) | $N_d$ | $V_d$ |
|---|---|---|---|---|---|
| | S1 | 277.28 | | | |
| L1 | | | 16.32 | 1.492 | 57.1 |
| | S2 | ∞ | | | |
| | | | 165.00 | | |
| | S3 | 134.85 | | | |
| L2 | | | 34.21 | 1.492 | 57.1 |
| | S4 | −320.56 | | | |
| | | | 119.16 | | |
| | S5 | −71.29 | | | |
| L3 | | | 2.0 | 1.492 | 57.1 |
| | S6 | ∞ | | | |
| | | | 0 | | |
| | S7 | ∞ | | | |
| L4 | | | 19.50 | 1.501 | 56.3 |
| | S8 | ∞ | | | |

Aspheric surfaces: S1, S4, S5

| | S1 | S4 | S5 |
|---|---|---|---|
| D | $-.3271 \times 10^{-7}$ | $.3372 \times 10^{-7}$ | $-.1161 \times 10^{-5}$ |
| E | $.5710 \times 10^{-13}$ | $-.8155 \times 10^{-13}$ | $.1336 \times 10^{-9}$ |
| F | $-.9089 \times 10^{-16}$ | $-.1687 \times 10^{-15}$ | $-.6962 \times 10^{-14}$ |
| G | $.3046 \times 10^{-20}$ | $.1257 \times 10^{-19}$ | $-.5108 \times 10^{-18}$ |
| K | 1.326 | −5.183 | −5.599 |

where L1–L4 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4 and S5 are aspheric.

13. A lens according to claim 5 scaled to an EFL of 86.06 mm and relative aperture of f/1.63 is described substantially as follows:

| | | Surface Radius (mm) | Axial Distance Between Surfaces (mm) | $N_d$ | $V_d$ |
|---|---|---|---|---|---|
| | S1 | 135.41 | | | |
| L1 | | | 7.32 | 1.492 | 57.1 |
| | S2 | ∞ | | | |
| | | | 72.25 | | |
| | S3 | 80.59 | | | |
| L2 | | | 12.63 | 1.492 | 57.1 |
| | S4 | −120.47 | | | |
| | | | 66.57 | | |
| | S5 | −33.11 | | | |
| L3 | | | 4.00 | 1.492 | 57.1 |
| | S6 | ∞ | | | |
| | | | 0 | | |
| | S7 | ∞ | | | |
| L4 | | | 5.00 | 1.522 | 59.5 |
| | S8 | ∞ | | | |

Aspheric surfaces: S1, S4, S5

| | S1 | S4 | S5 |
|---|---|---|---|
| D | $-.3590 \times 10^{-6}$ | $.1889 \times 10^{-7}$ | $-.9383 \times 10^{-5}$ |
| E | $-.4365 \times 10^{-10}$ | $-.1168 \times 10^{-11}$ | $.5695 \times 10^{-8}$ |
| F | $.2916 \times 10^{-14}$ | $.3344 \times 10^{-13}$ | $-.2003 \times 10^{-11}$ |
| G | $-.3065 \times 10^{-17}$ | $-.2635 \times 10^{-16}$ | $.1016 \times 10^{-15}$ |
| K | 1.326 | −5.183 | −5.600 |

where L1–L4 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4 and S5 are aspheric.

14. A lens according to claim 5 scaled to an EFL of 161.5 mm and relative aperture of f/1.36 is described substantially as follows:

| | | Surface Radius (mm) | Axial Distance Between Surfaces (mm) | $N_d$ | $V_d$ |
|---|---|---|---|---|---|
| | S1 | 295.91 | | | |
| L1 | | | 12.40 | 1.492 | 57.1 |
| | S2 | ∞ | | | |
| | | | 157.80 | | |
| | S3 | 124.43 | | | |
| L2 | | | 26.77 | 1.492 | 57.1 |
| | S4 | −247.76 | | | |
| | | | 119.00 | | |
| | S5 | −65.61 | | | |
| L3 | | | 2.00 | 1.492 | 57.1 |
| | S6 | ∞ | | | |
| | | | .02 | | |
| | S7 | ∞ | | | |
| L4 | | | 10.00 | 1.522 | 59.2 |
| | S8 | ∞ | | | |

Aspheric surfaces: S1, S4, S5

| | S1 | S4 | S5 |
|---|---|---|---|
| D | $-.4807 \times 10^{-7}$ | $.4615 \times 10^{-7}$ | $-.1975 \times 10^{-5}$ |
| E | $.1293 \times 10^{-11}$ | $.8841 \times 10^{-12}$ | $.5394 \times 10^{-9}$ |
| F | $-.4013 \times 10^{-15}$ | $-.5635 \times 10^{-15}$ | $-.1015 \times 10^{-12}$ |
| G | $.2201 \times 10^{-19}$ | $.4264 \times 10^{-19}$ | $.6804 \times 10^{-17}$ |
| K | 1.326 | −5.183 | −5.599 |

where L1–L4 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4 and S5 are aspheric.

15. A lens according to claim 5 scaled to an EFL of 144.8 mm and relative aperture of f/1.34 is described substantially as follows:

| | | Suface Radius (mm) | Axial Distance Between Surfaces (mm) | $N_d$ | $V_d$ |
|---|---|---|---|---|---|
| | S1 | 206.94 | | | |
| L1 | | | 14.75 | 1.492 | 57.1 |
| | S2 | ∞ | | | |
| | | | 101.60 | | |
| | S3 | 133.35 | | | |
| L2 | | | 26.92 | 1.492 | 57.1 |
| | S4 | −168.93 | | | |
| | | | 90.82 | | |
| | S5 | −59.54 | | | |
| L3 | | | 4.00 | 1.492 | 57.1 |
| | S6 | ∞ | | | |
| | | | 10.00 | | |
| | S7 | ∞ | | 1.522 | 59.5 |
| L4 | | | 10.00 | | |
| | S8 | ∞ | | | |

Aspheric surfaces: S1, S4, S5

| | S1 | S4 | S5 |
|---|---|---|---|
| D | $-.1095 \times 10^{-6}$ | $-.3706 \times 10^{-7}$ | $-.2206 \times 10^{-5}$ |
| E | $-.2939 \times 10^{-11}$ | $.2728 \times 10^{-11}$ | $.5295 \times 10^{-9}$ |
| F | $-.5110 \times 10^{-15}$ | $.5544 \times 10^{-15}$ | $-.9310 \times 10^{-13}$ |
| G | $-.5232 \times 10^{-20}$ | $-.9772 \times 10^{-19}$ | $.6095 \times 10^{-17}$ |
| K | 1.326 | −5.183 | −5.599 |

where L1–L4 are successive lens elements from the image end, S1–S8 are successive element surfaces, the surface radii where positive are surfaces convex to the image end and where negative are concave to the image end, $N_d$ is the index of refraction of the lens elements, $V_d$ is the dispersion of the lens measured by the Abbe number, and surfaces S1, S4 and S5 are aspheric.

16. The lens of claim 1 or claim 2 wherein the second group consists of a bi-convex element and a positive element having a convex image side surface and a nearly plano to plano object side surface.

17. The lens claim 1 or claim 2 wherein the first and third groups each consist of one element.

18. The lens of claim 1 wherein the negative element of said third group has a plano object side surface.

19. The lens of claim 2 wherein the first group includes an element having at least one aspheric surface.

20. The lens of claim 1 or claim 2 wherein the second group consists of two positive elements, each of the elements having an aspheric surface.

21. The lens of claim 1 wherein said second group includes a second positive element.

22. A projection lens for a cathode ray tube display consisting of three groups, the first group from the image end comprising an element having at least one aspheric surface, the second group consisting of a bi-convex element and another positive element; the third group comprising a negative element and serving as a field flattener essentially correcting the Petzval curvature of the first and second groups, said third group having an aspheric surface concave to the image end.

* * * * *

UNITED STATES PATENT AND TRADEMARK OFFICE

CERTIFICATE OF CORRECTION

PATENT NO. : 4,348,081

DATED : September 7, 1982

INVENTOR(S) : Ellis I. Betensky

It is certified that error appears in the above-identified patent and that said Letters Patent are hereby corrected as shown below:

Column 4, Table I, Under heading "Vd": Change the ratio "59.2" to -- 59.5 --.

Column 8, Table VIII, Under heading "Vd": Change the ratio "59.2" to -- 59.5 --.

Column 9, Table IX, Under heading "Vd": Change the ratio "59.2" to -- 59.5 --.

Column 16, Claim 14, Line 19, Under heading "Vd": Change the ratio from "59.2" to -- 59.5 --.

Signed and Sealed this

*Fifteenth* Day of *February 1983*

[SEAL]

*Attest:*

GERALD J. MOSSINGHOFF

*Attesting Officer* *Commissioner of Patents and Trademarks*